United States Patent [19]

Nishioka et al.

[11] Patent Number: 4,837,445
[45] Date of Patent: Jun. 6, 1989

[54] COARSE ADJUSTING DEVICE OF SCANNING TUNNELING MICROSCOPE

[75] Inventors: Tadashi Nishioka; Takao Yasue; Hiroshi Koyama, all of Itami City, Japan

[73] Assignee: Mitsubishi Denki Kabushiki Kaisha, Japan

[21] Appl. No.: 230,347

[22] Filed: Aug. 10, 1988

[30] Foreign Application Priority Data

Apr. 4, 1988 [JP] Japan .................. 63-81224

[51] Int. Cl.⁴ .......................... G21K 5/10; G21K 5/08
[52] U.S. Cl. ............................. 250/442.1; 250/440.1; 250/306; 350/530
[58] Field of Search ............ 250/310, 306, 307, 440.1, 250/442.1; 350/530, 521, 321

[56] References Cited

U.S. PATENT DOCUMENTS 4,762,996 8/1988 Binnig et al. .................. 250/306
4,782,236 11/1988 Chitayat .................. 250/442.1

OTHER PUBLICATIONS

Jericho et al., "Scanning Tunneling Microscope with Micrometer Approach and Thermal Compensation", Rev. Sci. Instrum., 58 (8), 8/87, pp. 1349-1352.
Scott et al., "Magnetically Driven Micropositioners" Rev. Sci. Instrum., vol. 56 pp. 1970-1971 (1985).
Rinnig et al., "Scanning Tunneling Microscopy", Surface Science vol. 126 pp. 236-244 (1983).
Corb et al., "An Electromagnetic Microscopic Positioning Device for the Scanning Tunneling Microscope" Journal Appl. Phys. vol. 58 pp. 3947-3953 (1985).
Demuth et al., "A Simplified Scanning Tunneling Microscope for Surface Science Studies" J. Vac. Sci. Technol. vol. A 4(3), pp. 1320-1323 (1986).

Primary Examiner—Carolyn E. Fields
Assistant Examiner—John A. Miller
Attorney, Agent, or Firm—Leydig, Voit & Mayer

[57] ABSTRACT

A coarse adjusting device for coarsely positioning a specimen and a probe relative to each other in a scanning tunneling microscope has a main body having a hollow space formed therein, transmission member extending through the hollow space of the main body and screwed at its one end to the main body so as to be moved in one and the other directions as it is rotated about its axis. The transmission member is provided at its portion within the hollow space with a tapered peripheral surface. The coarse adjusting device also has a coarsely-movable member disposed for movement in the direction perpendicular to the axis of rotation of the transmission member. The coarsely-movable member has one end contacting the tapered surface of the transmission member within the hollow space and the other end extended to the outside of the main body for carrying an object such as a specimen.

21 Claims, 7 Drawing Sheets

COARSE ADJUSTING DEVICE OF SCANNING TUNNELING MICROSCOPE

BACKGROUND OF THE INVENTION

The present invention relates to a coarse adjusting deice of a scanning tunneling microscope and, more particularly, to a coarse adjusting device having a mechanical transmission mechanism.

In general, a scanning tunneling microscope has a coarse adjusting device and a fine adjusting device which are arranged in a pair. A specimen to be observed is held by a coarse adjusting device, while a probe is provided on the fine adjusting device. In operation, the coarse adjusting device first operates to bring the surface of the specimen to a position near the end of the probe, e.g., to a position which is about 0.1 mm away from the end of the probe. Then, the fine adjusting device operates so as to bring the probe closer to the surface of the specimen, while applying a predetermined voltage between the specimen and the probe, until the tunnel current flowing between the specimen and the probe reaches a predetermined level. Subsequently, the fine adjusting device operates to enable the probe to scan the surface of the specimen so that any concavities and convexities on the specimen surface are sensed and determined in atomic scale through the detection of the change in the tunnel current.

The known coarse adjusting devices are generally sorted into the following groups:

(1) piezoelectric coarse adjusting device [G. Binnig and H. Rohror Surface Science., Vol. 126 pp 236-244 (1983)]

(2) magnetic coarse adjusting device [D. P. E. Smith and S. A. Elrod: Rev. Sci. Instrum., Vol. 56 pp 1970-1971 (1985), B. W. Corb, M. Ringger and H. J. Guntherrodt: J. Appl. Phys., Vol. 58 pp 3947-3953 (1985)] and (3) mechanical coarse adjusting device [J. E. Demuth, R. J. Hamers, R. M. Tromp and M. E. Welland: J. Vac. Sci. Technol., Vol. A4(3) pp 1320-1323 (1968)]

The piezoelectric coarse adjusting mechanism employs a piezoelectric element both ends of which are alternately fixed by electrostatic attraction. The coarse adjustment is effected by causing the piezoelectric element to expand or to contract. This type of device suffers from a disadvantage in that a drift of atomic scale is caused in the electrostatic attraction so as to impair smooth movement.

The magnetic coarse adjusting mechanism incorporates a permanent magnet and a solenoid coil which cooperate with each other in effecting the fixing and movement by magnetic forces. This type of coarse adjusting mechanism, however, is not suitable for use with the scanning electron microscope because the operation of the microscope tends to be adversely affected by the static magnetic field produced by the permanent magnet. In addition, this type of device shows an inferior mechanical rigidity because the fixing is effected by magnetic force.

The mechanical coarse adjusting device employ cantilevered thin plates carrying a probe and a specimen. The free ends of the plates are urged by for example, screws or springs so as to effect relative movement of the object such as the specimen. In this case, the amount of movement of the screw or the spring directly provides the displacement of the object, so that it is very difficult to effect a fine and smooth movement of the object.

SUMMARY OF THE INVENTION

Accordingly, an object of the present invention is to provide a coarse adjusting mechanism of a scanning tunneling microscope, having a high mechanical rigidity and capable of effecting smooth movement of the probe or the specimen.

To this end, according to the present invention, there is provided a coarse adjusting device for use in a scanning tunneling microscope comprising: a main body having a hollow space; transmission means extending through the hollow space of the main body and screwed at its one end to the main body so as to be moved in one or the other direction as it is rotated about its axis clockwise or counter-clockwise, respectively, the transmission means being provided along a portion thereof within the hollow space with a tapered peripheral surface; and a coarsely-movable member disposed for movement in the direction perpendicular to the axis of rotation of the transmission means, the coarsely-movable member having one end thereof contacted by the tapered surface of the transmission means within the hollow space and the other end thereof extended to the outside of the main body, the extended other end carrying an object to be scanned.

In operation, a rotation of the transmission means about its axis causes a forward or backward movement of the transmission means itself with respect to the main body so that the coarsely-movable member having one end contacting the tapered surface of the transmission means moves in a direction perpendicular to the axis of rotation of the transmission means.

The above and other objects, features and advantages of the present invention will become clear from the following description when the same is read in conjunction with the accompanying drawings.

DESCRIPTION OF THE PREFERRED EMBODIMENTS

Preferred embodiments of the present invention will be described hereinunder with reference to the accompanying drawings.

Figure 1:
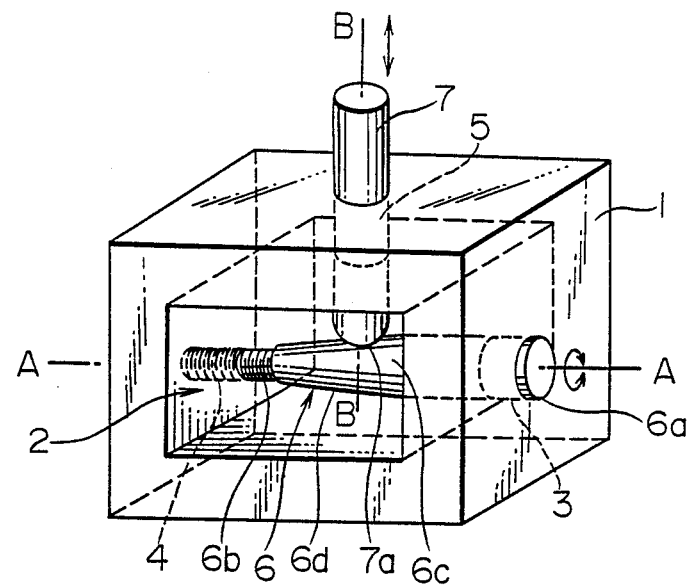
FIG. 1 is a perspective view of a coarse adjusting device in accordance with a first embodiment of the present invention.

Referring first to FIG. 1, a first embodiment of the coarse adjusting device in accordance with the present invention has a cubic or a parallelepiped main body 1 having a hollow space 2. The main body 1 has a cylindrical first through hole 3 penetrating one side wall thereof and opening to the hollow space 2 on a straight line A—A a female threaded portion 4 formed in the opposing wall and placed on the same straight line A—A as the first through hole 3, and a second through hole 5 formed in the upper wall and opening into the hollow space 2 on a straight line B—B which is perpendicular to the line A—A.

A transmission member 6 constituting transmission means which is an essential part of the invention is screwed into the female-threaded portion 4 via the through hole 3. As will be seen from FIG. 2, the transmission member 6 is cylindrically formed at its one end as at 6a and male-threaded threaded at its other end as at 6b, and has a conical portion 6c intermediate between these ends 6a and 6b. The cylindrical end 6a has a diameter which just fits in the first through hole 3 of the main body 1, while the male threaded of the male-threaded end 6b has an outside diameter d and a pitch p which are suitable to enable the male-threaded end 6b to be screwed into the female-threaded hole 4 in the main body 1. The conical portion 6c is provided on the outer peripheral portion of the transmission member 6 with a tapered surface 6d the diameter of which gradually decreases from the cylindrical portion 6a towards the male-threaded portion 6b.

As will be seen from FIG. 1, the cylindrical portion 6a of the transmission member 6 fits in the through-hole 3 formed in the main body 1 while the male-threaded portion 6b is screwed into the female-threaded portion 4. The cylindrical portion 6a partially projects to the outside of the main body 1 past the through-hole 3. Therefore, the rotation of the transmission member 6 about the axis A—A causes the male-threaded portion 6b to move in one or the other direction so as to cause the transmission member 6 to move along the axis A—A.

On the other hand, the second through hole 5 of the main body 1 movably receives the cylindrical coarsely-movable member 7. The coarsely-movable member 7 has a spherically and smoothly shaped end portion 7a which is positioned within the hollow space 2 of the main body 1. The coarsely-movable member 7 is always urged inwardly into the hollow space 2 by the force of gravity or by a spring which is not shown, so that the end 7a of the coarsely movable member 7 always rests on the tapered surface 6d of the transmission member 6 within the hollow space 2. The other end 7b of the coarsely-movable member 7 projects outward from the main body 1. An object such as a specimen, probe or a fine adjusting mechanism is attached to the projecting end 7b of the coarsely-movable member 7.

In the coarse adjusting mechanism having the described construction, as the cylindrical portion 6a of the transmission member 6 projecting outward from the main body 1 is rotated about the axis A—A, the transmission member 6 moves along the axis A—A due to the male-threaded portion 6b being screwed into or out of the female-threaded portion 4 of the main body 1. As described above, the transmission member 6 is provided with a conical portion 6c having a tapered surface 6d which is contacted by the end 7a of the coarsely-movable member 7. As a result, the coarsely-movable movable member 7 is moved in the direction of a line B—B which is perpendicular to the axis A—A.

Figure 2:
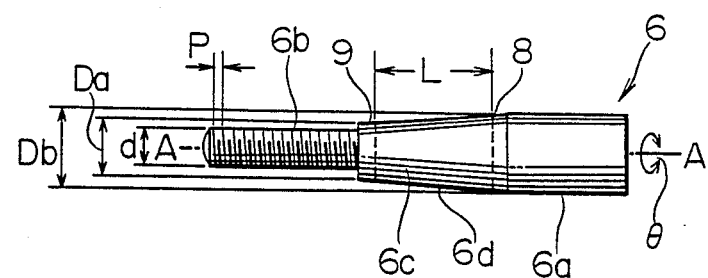
FIG. 2 is a front elevational view of a transmission member used in the first embodiment.

Referring now to FIG. 2, numeral 8 denotes the point of contact between the tapered surface 6d of the transmission member 6 and the end 7a of the coarsely-movable member 7 when the transmission member 6 has been fully moved towards the end adjacent to the female-threaded portion 4 of the main body 1. On the other hand, a numeral 9 designates a point of the contact as obtained when the transmission member 6 has been fully moved to the end adjacent to the through-hole 3. The distance between these points 8 and 9 of contact is represented by L.

The diameter of the transmission member 6 at the points 8, 9 of contact are represented by Da and Db. In this case, therefore, the gradient of the tapered surface 6d is given by (Db−Da)/2L.

The amount $\epsilon$ of movement of the coarsely-movable member along the axis B—B as obtained when the transmission member 6 is rotated through an angle $\theta$ is represented by the following formula (1).

$$\epsilon = p\theta(Db-Da)/4\pi L \qquad (1)$$

where, p indicates the pitch of the male-threaded portion 6b of the transmission member 6.

The male-threaded portion 6b of the transmission member 6 is supposed here to have an outside diameter d of 2 mm and pitch p of 0.25 mm. while the tapered surface 6d is determined to have dimensions of L=10 mm, Da=2.2 mm and Db=2.6 mm. The minimum adjustable displacement $\epsilon$min is defined as the amount $\epsilon$ of movement of the coarsely-movable member 7 as obtained when the transmission member 6 is turned by an angle $\theta = 2\pi/50$ radian, which corresponds to the minimum graduation of an ordinary micrometer. Thus, the minimum adjustable displacement $\epsilon$min is calculated as $\epsilon$min=0.1 μm. On the other hand, the maximum displacement or working distance cmax is defined as the difference between the position of the coarsely-movable member 7 when the same is contacting the transmission member 6 at the contact point 8 and the position of the same contacting the transmission member 6 at the point 9. Thus, the maximum displacement smax is represented by $\epsilon$,sc=(Db−Da)/2. Thus, the working distance $\epsilon$max is computed to be 0.2 mm. The value 0.2 mm of the working distance is large enough to ensure that the specimen or the probe attached to the operating portion 7b of the coarsely-movable member 7 can be properly located with respect to the opposing probe or the specimen through a visual check by a loupe, real microscope, television camera and so forth. The operator then rotates the transmission member 6 so as to reduce the distance between the specimen and the probe to be sufficiently small to generate a tunnel current therebetween.

Since the minimum adjustable displacement $\epsilon$min is 0.1 μm (=100 nm), the fine adjusting device can be operated with a voltage which is as low as 20 volts, provided that a piezoelectric fine adjusting mechanism having a voltage sensitivity of, for example, 5 nm/volt is attached to the operating portion 7b of the coarsely-movable member 7.

According to the mechanical processing technic which is presently available, it is possible to obtain a surface roughness of the tapered surface 6d of the transmission member which is on the order of 0.05 μm in terms of 10-point mean roughness.

Figure 3:
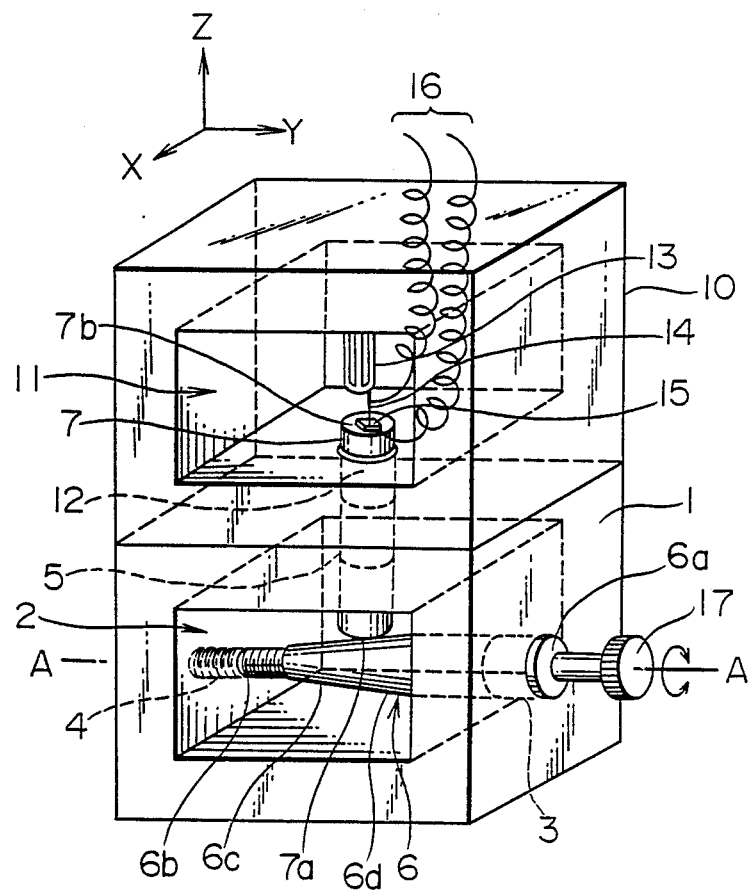
FIG. 3 is a perspective view of a scanning tunneling microscope which incorporates the first embodiment of the invention.

FIG. 3 illustrates a scanning tunneling microscope incorporating the coarse adjusting device of the first embodiment combined with a fine adjusting mechanism.

The coarse adjusting device incorporated in this microscope has, as in the case of FIG. 1, a main body 1, a transmission member 6 and a coarse adjusting device 7. The coarse adjusting device carries a fine adjusting mechanism. The fine adjusting mechanism has a main body 10 which is mechanically connected to the main body 1 of the coarse adjusting device by means of screws or a strong adhesive such as an epoxy resin. The main body 10 of the fine adjusting mechanism has a hollow space 11 and a through hole 12 which opens into the hollow space 11. This through hole 12 is formed coaxially with the second through hole 5 of the coarse adjusting device, and the operating portion 7b of the coarsely-movable member 7 projects into the hollow space 11 past the through-hole 12.

A fine scanning portion 13 making use of a cylindrical piezoelectric element is attached to the inner surface of the hollow 11 opposing to the through hole 12, and a probe 14 is attached to the end of the fine scanning portion 13. The fine scanning portion 13 is provided with a multiplicity of electrodes and is capable of conducting three-dimensional scanning in the horizontal plane (X-Y directions in FIG. 3) and in the vertical direction (Z-direction in FIG. 3).

A specimen 15 is attached to the operating portion 7b of the coarsely-movable member 7. Conductor wires 16 are connected at their one ends to the probe 14 and to the operating portion 7b of the coarsely-movable member 7. These conductor wires 16 are effective in applying a voltage between the probe 14 and the specimen 15 and to pick-up a tunnel current flowing therebetween. Thus, the other ends of these conductor wires 16 are connected to a tunnel current measuring device (not shown). A knob 17 attached to the cylindrical portion 6a of the transmission member 6 is provided for enabling manual rotation of the transmission member 6.

The operation of this embodiment is as follows. Before mounting the probe 14 and the specimen 15, the knob 17 is rotated counter-clockwise so that the coarsely-movable movable member 7 is lowered to the lowermost position. In this state, a specimen 15 is fixed to the upper surface of the operating portion 7b of the coarsely-movable member 7 by means of a conductive adhesive. Subsequently, the probe 14 is mounted on the fine scanning portion 13. This must be done with the greatest care such as to avoid interference between the end of the probe and the specimen, by a visual check through, for example, a magnifier. The mounting of the probe 14 may be conducted by placing a metallic tube in the fine scanning portion 13 and introducing the probe 14 into the fine tube. The distance between the end of the probe 14 and the specimen 15 should be determined to be about 0.1 and 0.2 mm.

Subsequently, a predetermined voltage is applied between the probe 14 and the specimen 15 through the conductor wires 16 and monitoring of the tunnel current is commenced by making use of the tunnel current measuring device.

Then, the knob 17 is manually rotated clockwise so as to gradually raise the coarsely-movable member 7. That is, the distance between the end of the probe 14 and the specimen 15 is decreased. The rotation of the knob 17 is stopped when the tunnel current flowing between the probe 14 and the specimen 15 has reached a predetermined level.

Thereafter, the fine adjusting mechanism is operated to enable the probe 14 to perform fine scanning. This can be conducted through a feedback control of the tunnel current by constant-current method [G. F. A. van de Walle, J. W. Gerritsen, H. van Kempen, and P. Wyder: Rev. Sci. Instrum., Vol. 56, pp 1573-1576 (1985)]. According to this method, a voltage proportional to the error current, i.e.,the difference between a preset tunnel current and the actually measured current is applied to the electrode for effecting the vertical scanning motion (scanning movement in the Z direction) of the fine scanning portion 13, thus effecting fine adjustment of the probe 14 such as to reduce the error current to zero. By setting the tunnel current always at the preset level, it is possible to maintain a constant distance between the end of the probe 14 and the specimen 15.

In this state, a predetermined voltage is applied to the electrodes for driving the fine scanning portion 13 in X-Y directions, thereby causing the probe 14 to perform a horizontal scan in X-Y directions. Since the probe 14 has been vertically adjusted in the Z direction so as to maintain a constant distance between its end and the specimen 15, the surface of the specimen is scanned three-dimensionally.

The voltages applied to the respective electrodes for driving the fine scanning portion 13 may be input as display signals to a display means such as a CRT, so that the surface of the specimen can be observed in atomic scale.

It is also possible to effect the rotation of the transmission member 6 by means of a stepping motor, instead of manually rotating the knob 17. For instance when the transmission member 6 of the dimensions mentioned before is driven by a stepping motor having a resolution of 0.9 deg/step, a sufficiently small minimum displacement $\epsilon_{min}$ as calculated from the formula (1) is obtained as follows.

$$\epsilon_{min} = 0.25 \times (0.9/360) \times (2.6 - 2.2)/2 \times 10[mm] = 12.5 \text{ nm}$$

It is thus possible to obtain a coarse adjusting device having a small minimum displacement. It is also possible to drive the transmission member 6 through a micrometer or a differential micrometer.

Although in the described embodiment the specimen 15 and the probe 14 are attached to the operating portion 7b of the coarsely-movable member 7 and the fine scanning portion 13, respectively, the arrangement may be reversed such that the probe 14 and the specimen 15 are attached to the operating portion 7b of the coarsely-movable member 7 and the fine scanning portion 13, respectively.

Figure 4:
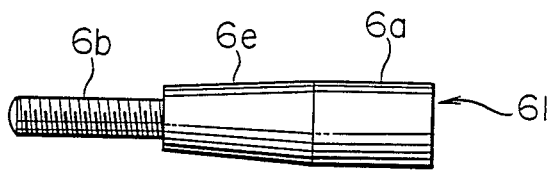
FIGS. 4 to 7 are front elevational views of modifications of the transmission members.
Figure 5:
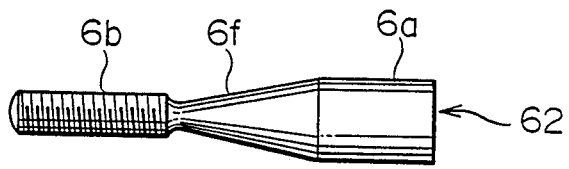

It is also possible to obtain a desired movement of the coarsely-movable member 7 by preparing a plurality of transmission members 6 and selectively using them. For instance, by making use of a transmission member 61 having a small gradient of the tapered surface 6e as shown in FIG. 4, the minimum displacement of the coarsely-movable member 7 is reduced so that the coarse adjusting device can provide for fine adjustment of the distance between the probe 14 and the specimen 15. Conversely, the use of a transmission member 62 having a large gradient tapered surface 6f provides for a large maximum displacement, i.e., the working distance of the coarsely-movable member 7, thereby to offer a higher operating efficiency for initially setting the probe 14 and the specimen 15. The male-threaded portions of these transmission members 61 and 62 are of the same size, so that both transmission members 61 and 62 are interchangeable, thus offering a wide adaptability of the coarse adjusting device.

Figure 6:
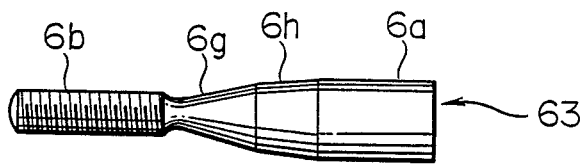

FIG. 6 shows a modification in which a transmission member 63 has tapered surfaces 6g and 6h of different gradients which are adjacent to each other. A first tapered surface 6g provides for a large work distance, while the second tapered surface 6h affords a fine adjustment of the coarsely-movable member 7.

Figure 7:
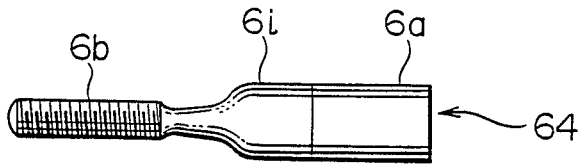

FIG. 7 shows another modification in which a transmission member 64 has a tapered surface 6i the gradient of which changes linearly. This modification provides for a smooth change from an initial coarse movement of the coarsely-movable member 7 for providing a large working distance and then a fine movement for providing fine adjustment.

Figure 8:
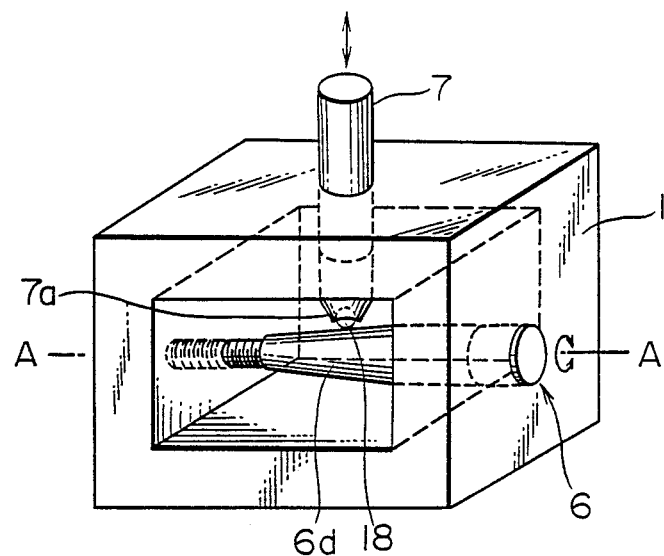
FIG. 8 is a perspective view of a second embodiment.

FIG. 8 shows a second embodiment of the coarse adjusting device. In this embodiment, a small ball 18 is rotatably embedded in the end 7a of the coarsely-movable member 7 in such a manner that it is partially exposed to the outside. The exposed portion of the small ball 18 contacts the tapered surface 6d of the transmission member 6. The rotation of the transmission member 6 about the axis A—A causes the small ball 18 contacting the tapered surface 6d of the transmission member 6 to be rotated within the end 7a due to friction. Thus, the friction is reduced due to the rolling contact between the transmission member 6 and the small ball 18 on the coarsely-movable member 7. In consequence, a smooth movement of the coarsely-movable member is ensured even when the coarse adjusting device is used in a very high vacuum.

Figure 9:
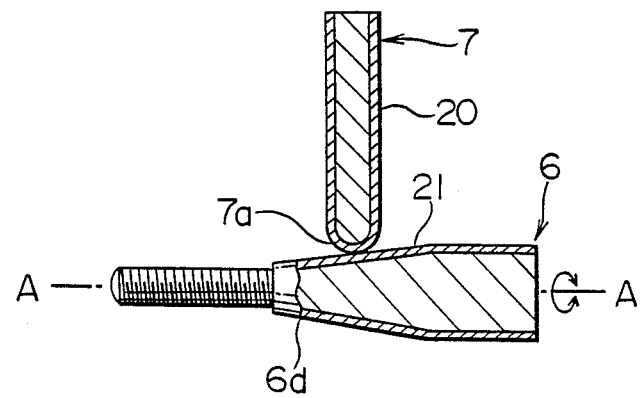
FIG. 9 is a sectional view of an essential portion of the third embodiment.

FIG. 9 schematically shows a third embodiment of the present invention. Titanium nitride films (TiN) 21 and 20 are formed on at least the tapered surface 6d of the transmission member 6 and the end 7a of the coarsely-movable member 7, respectively. As is known to those skilled in the art, the titanium nitride film exhibits a small friction coefficient even when heated up to a high temperature of about 250° C. in a very high vacuum. Therefore, the third embodiment appreciably reduces the level of friction in the region of contact between the transmission member 6 and the coarsely-movable member 7 during the rotation of the transmission member 6, thus affording a smooth sliding movement of the coarsely-movable member 7. The friction between the transmission member 6 and the coarsely-movable member 7 does not change substantially even when the coarse adjusting device is heated to about 250° C. in a very high vacuum, whereby the degasing of the specimen 15 by baking can be facilitated.

The frictional force is further reduced when titanium nitride films are formed on the surfaces of the small ball 18 and the transmission member 6 in the second embodiment.

Figure 10:
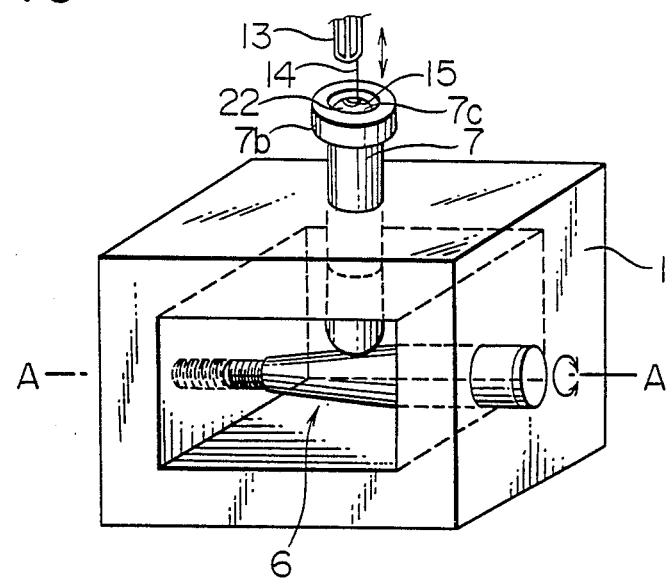
FIG. 10 is a perspective view of a fourth embodiment.

FIG. 10 shows a fourth embodiment in which a recess 7c is formed in the upper end surface of the operating portion 7b of the coarsely-movable member 7. The specimen 15 is mounted in this recess 7c. The recess 7c is filled with a liquid having no electrical conductivity, e.g., a non-electrolytic aqueous solution, so that the specimen 15 is immersed in the liquid 22. In operation, the probe 14 attached to the fine scanning portion 13 is made to scan the surface of the specimen 15 so that the surface of the specimen 15 in the liquid 22 can be observed at an atomic level. It is therefore possible to observe the specimen 15 while isolating it from the ambient air or to examine any chemical reaction between the specimen 15 and the liquid 22.

Figure 11:
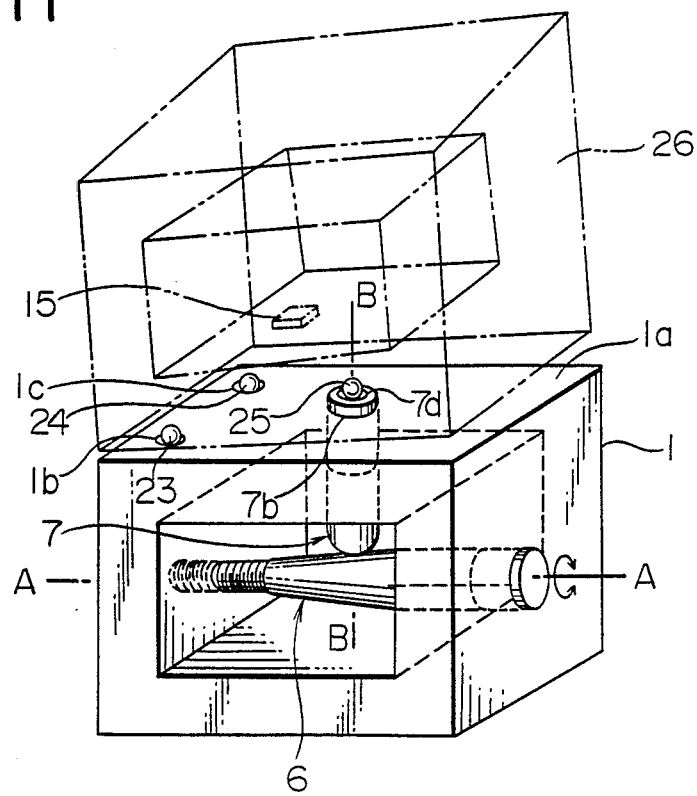
FIG. 11 is a perspective view of a fifth embodiment.

FIG. 11 shows a fifth embodiment of the present invention in which a pair of recesses 1b and 1c are formed in the upper surface 1a of the main body 1, while a single recess 7d is formed in the upper end surface of the operating portion 7b of the coarsely-movable member 7. These recesses 1b, 1c and 7d receive a first to third balls 23, 24 and 25, respectively. The recesses 1b and 1c are spaced from each other and are spaced also from the through-hole 5 in the main body 1 through which the coarsely-movable member 7 is extended. In other words, three recesses 1b, 1c and 7d are arranged such that the area of a triangle formed by the apices of the balls 23 to 25 is maximized.

This arrangement enables the inclination of a plane containing apices of the three balls to be adjusted by causing the coarsely-movable member 7 to be moved up and down along the B—B axis. Thus, if the specimen 15 is mounted on a frame 26 which is carried by these three balls 23 to 25, the inclination of the specimen 15 can be adjusted by adjusting the coarsely-movable member 7 along the axis B—B. This arrangement is effective in maintaining the specimen 15 in, for example, a horizontal position. In this case, the frame 26 is provided along the underside thereof with recesses at positions corresponding to the balls 23 to 25, thus preventing the frame 26 from moving horizontally with respect to the main body 1.

The specimen 15 may be mounted closer to the first or the second ball 23 or 24 than to the third ball 25 provided on the coarsely-movable member 7. In such an arrangement, when the coarsely-movable member 7 is moved up and down by the rotation of the transmission member 6, the vertical movement of the specimen 15 is smaller than that of the coarsely-movable member 7, thus enabling finer adjustment of the specimen 15.

Figure 12:
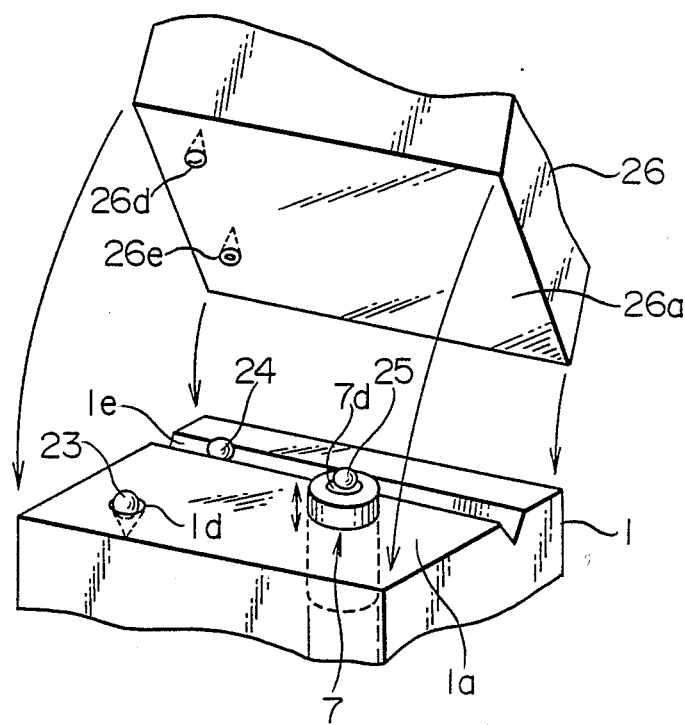
FIG. 12 is a perspective view of a modification of the fifth embodiment.

It is also possible to further smooth the movement of the frame 26, by installing the balls 23 to 25 in a manner shown in FIG. 12. Namely, the main body 1 is provided in the upper surface thereof with a conical recess 1d and a straight V-shaped groove 1e and the first and the second balls 23 and 24 are fit in the recess 1d and the groove 1e, respectively. The size of the recess 1d and the groove 1e are beforehand determined in such a manner that more than the upper half portions of the first and the second balls 23 and 24 are exposed above the upper surface 1a of the main body 1. On the other hand, the frame 26 is provided in the underside thereof with corresponding conical recesses 26d and 26e for receiving the balls 23 and 24, respectively. These recesses 26d and 26e are also sized to allow more than half of the balls to be exposed. The frame 26 does not have any recess which would correspond to the third ball 25 fitted in the recess 7d in the coarsely-movable member 7. Thus, the ball 25 makes a direct contact with the underside 26a of the frame 26.

This arrangement enables the second ball 24 to be moved along the V-shaped groove 1e so that the distance between the first ball 23 and the second ball 24 is adjustable. According to this arrangement, when the frame 26 is placed on the three balls 23 to 25, the first and the second balls 23 and 24 are correctly aligned within the recesses 26d and 26e even when there is some deviation in the precision of the distance between the recesses 26d and 26e. Since the frame 26 does not have any recess which would receive the third ball 25, the third ball 25 freely contacts the underside 26a of the frame 26.

According to this arrangement, therefore, the frame 26 is allowed to move very smoothly about two balls 23 and 24 which serve as fulcrums. In addition, the precision requirement for the main body 1 and the frame 26 becomes less severe, so that easier machining is facilitated.

When the main body 1 and the coarsely-movable member 7 and the frame 26 are made of a magnetic material, it becomes possible to retain the frame 26 on the main body 1 by magnetic force, by using permanent magnet balls as the balls 23 to 25.

Figure 13:
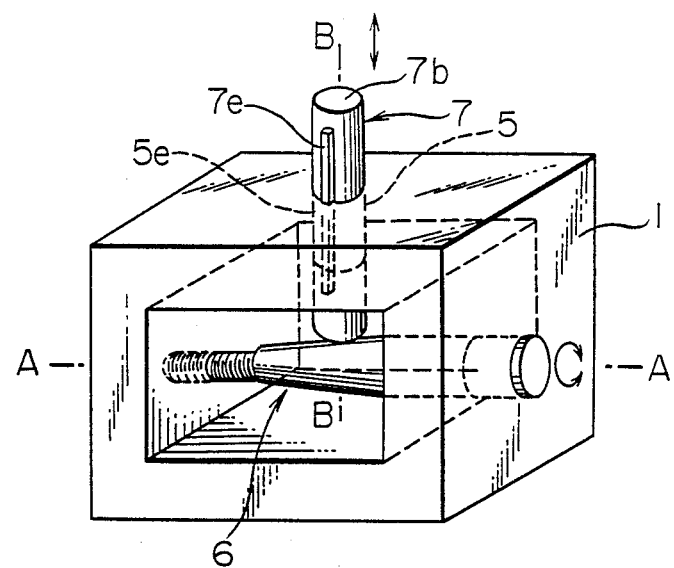
FIG. 13 is a perspective view of a sixth embodiment.

FIG. 13 is a perspective view of a sixth embodiment of the invention. This embodiment has a single ridge 7e formed on a side surface of the coarsely-movable member 7 which extends along the axis B—B, and a single groove 5e formed in the through-hole 5 which also extends in parallel with the axis B—B. The ridge 7e of the coarsely-movable member 7 is vertically slidably received in the groove 5e of the through-hole 5. This arrangement prevents the coarsely-movable member 7 from rotating about the axis B—B during vertical movement along the axis B—B. This embodiment, therefore, provides a coarse adjusting device having improved maneuverability because the specimen attached to the operating portion 7b of the coarsely-movable member 7 is prevented from rotating about the axis B—B during vertical movement of the coarsely-movable member 7.

Figure 14:
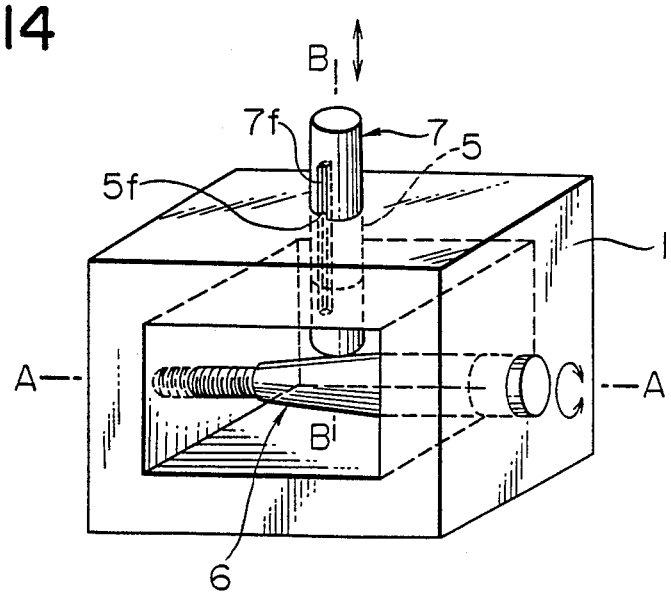
FIG. 14 is a perspective view of a modification of the sixth embodiment.

FIG. 14 shows a modification in which a straight groove 7f is formed in the coarsely-movable member 7, while a ridge 5f capable of mating with the groove 7f is formed on the wall of the through-hole 5. Obviously, this modification provides the same effect as that produced by the embodiment shown in FIG. 13.

In the described embodiments, the main body 1, the transmission members 6, 61 to 64 and the coarsely-movable member 7 are preferably made of a material having a small thermal expansion coefficient, e.g., Invar (Ni: 36%, Fe: 64%) which has a thermal expansion coefficient not greater than about $1.5 \times 10^{-6}$ at 20° C. The use of such a material will reduce the fluctuation in the position of the specimen attributable to a change in the ambient temperature, so that the stability of the scanning tunneling microscope is further improved.

In each embodiment described hereinbefore, the axis A—A of the transmission member 6 extends horizontally, while the axis B—B of the coarsely-movable member 7 extends vertically, so that the coarsely-movable member 7 is adapted to move vertically. This arrangement, however, is not exclusive. It is to be noted that, when the coarsely-movable member 7 cannot keep contact with the tapered surface 6d due to the force of gravity alone, it is necessary to urge the coarsely-movable member 7 into the hollow 2 by for example, a coiled spring.

As has been described, the high rigidity ensures a safe and stable operation of the coarse adjusting device even when the latter is combined with another device such as an vibration-free device.

What is claimed is:

1. A coarse adjusting device for use in a scanning tunneling microscope comprising:
   a main body having a hollow space;
   transmission means extending through said hollow space, said means having one end thereof screwed into said main body, so that said means moves in one or the other direction as said means is rotated about its axis, said transmission means being provided along the portion within said hollow space with a tapered peripheral surface; and
   a coarsely-movable member disposed for movement in a direction perpendicular to the axis of rotation of said transmission means, said coarsely-movable member having one end thereof contacting said tapered surface of said transmission means within said hollow space and the other end thereof extending out of said main body, the outwardly extending other end comprising means for carrying an object to be scanned.

2. A coarse adjusting device according to claim 1, wherein said transmission means has a plurality of tapered surfaces of different gradients.

3. A coarse adjusting device according to claim 1, wherein the gradient of said tapered surface of said transmission mean varies linearly.

4. A coarse adjusting device, according to claim 1, wherein said transmission means comprises means to be rotated manually.

5. A coarse adjusting device according to claim 4, wherein micrometer comprises means for rotating said transmission means.

6. A coarse adjusting device according to claim 5, wherein said micrometer is a differential micrometer.

7. A coarse adjusting device according to claim 1, wherein a stepping motor comprises means for rotating said transmission means.

8. A coarse adjusting device according to claim 1, further comprising a film coating having a low friction coefficient formed on said tapered surface of said transmission means and the outer peripheral surface of the end of said coarse-movable member contactable with said tapered surface of said transmission means.

9. A coarse adjusting device according to claim 8, wherein said film coating is made of titanium nitride.

10. A coarse adjusting device according to claim 1, wherein said coarsely-movable member has a ball rotatably embedded in the end thereof contactable with said tapered surface of said transmission means.

11. A coarse adjusting device according to claim 10, further comprising a film coating having a low coefficient of friction formed on said tapered surface of said transmission means and the surface of said ball.

12. A coarse adjusting device according to claim 11, wherein said film coating is made of titanium nitride.

13. A coarse adjusting device according to claim 1, wherein the end of said coarsely-movable member projecting out of said main body has a recess formed therein comprising means for containing a liquid having no electrical conductivity, so that a specimen as said object may be immersed in said liquid.

14. A coarse adjusting device according to claim 1, wherein said coarsely-movable member and said main body are provided with guide means which prevents said coarsely-movable member from rotating about its axis.

15. A coarse adjusting device according to claim 14, wherein said guide means comprises a single ridge provided on the side surface of said coarsely-movable member and a single groove formed in the wall of a through hole of said main body through which, said coarsely-movable member is extended and configured to fittingly receive said single ridge.

16. A coarse adjusting device according to claim 14, wherein said guide means comprises a single groove formed on the side surface of said coarsely-movable member and a single ridge formed on the wall of a through hole of said main body through which said coarsely-movable member is extended and configured to fit in said single groove.

17. A coarse adjusting device according to claim 1, further comprising a first ball and a second ball which are provided on the surface of said main body from which said coarsely-movable member is extended and a third ball provided on the end of said coarsely-movable member projecting out of said main body, said first, second and third balls comprise means for supporting an external object.

18. A coarse adjusting device according to claim 17, wherein said coarsely-movable member and said external object are made of a magnetic material, and said first, second and third balls are formed of permanent magnets.

19. A coarse adjusting device according to claim 17, wherein said main body has a conical recess for receiving said first ball and a straight V-shaped groove for receiving said second ball, said external object has a pair of conical recesses for fittingly receiving said first and second balls.

20. A coarse adjusting device according to claim 17, wherein a fine adjusting mechanism is provided on the surface of said main body from which said coarsely-movable member extends, and said end of said coarsely-movable member projecting out of said main body is positioned within said fine adjusting mechanism.

21. A coarse adjusting device according to claim 20, wherein a probe is held in said fine adjusting mechanism, and a fine scanning means is provided for enabling said probe to effect fine scan, on the surface of a specimen secured to the end of said coursely-movable member positioned within said fine adjusting mechanism.

* * * * *